(No Model.)
S. COLLINS.
CHURN.
No. 278,098. Patented May 22, 1883.
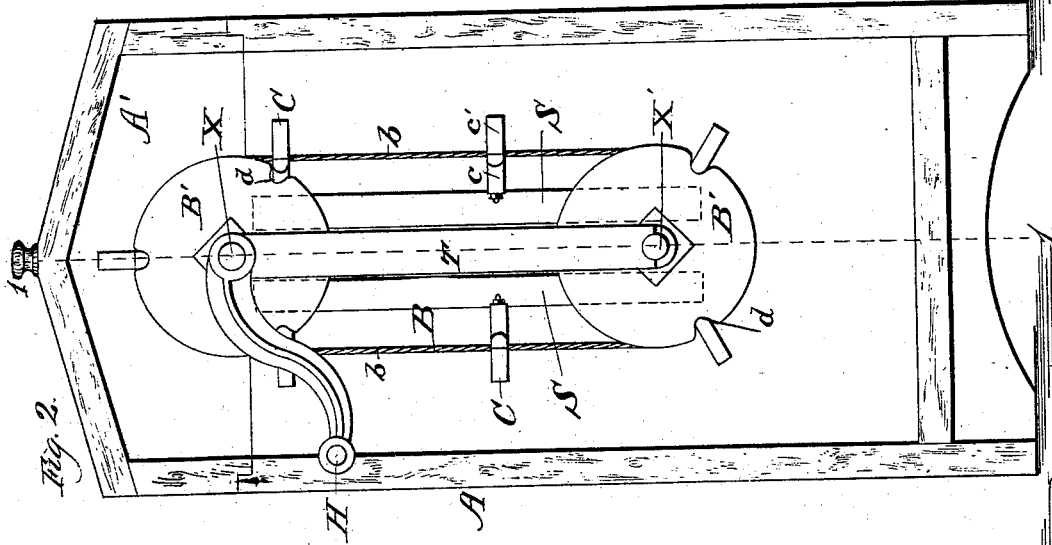
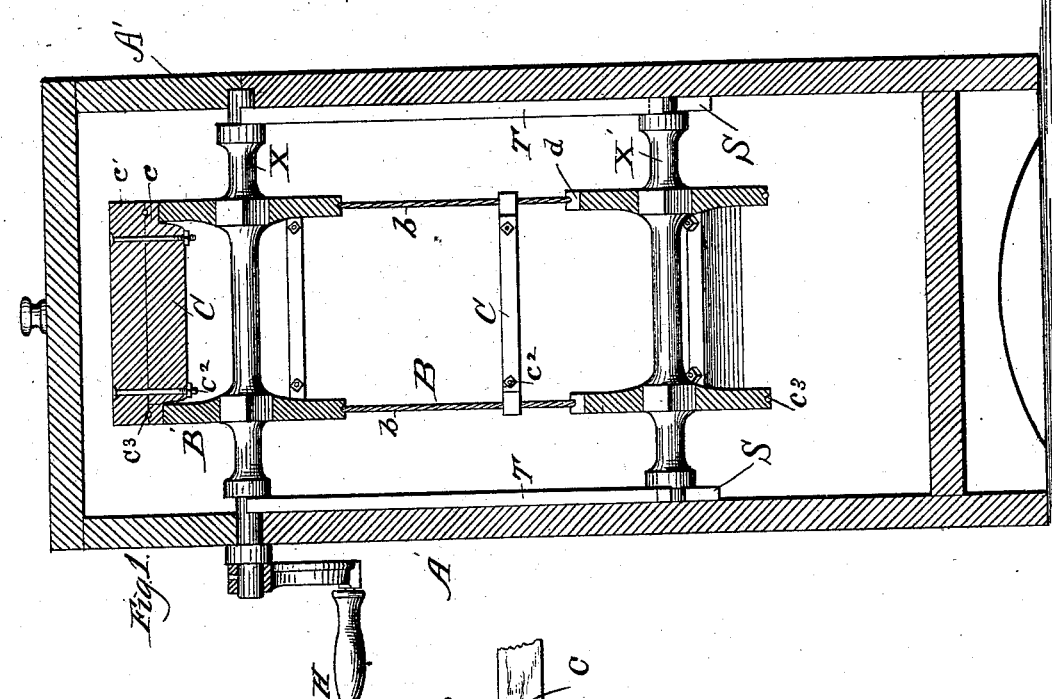
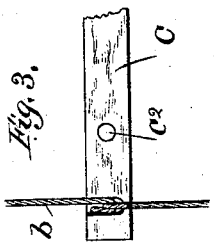
Witnesses
F. B. Townsend
Chas. E. Gaylord
Inventor
Stephen Collins
By A. M. Stout atty

UNITED STATES PATENT OFFICE.

STEPHEN COLLINS, OF HUNTSVILLE, ALABAMA.

CHURN.

SPECIFICATION forming part of Letters Patent No. 278,098, dated May 22, 1883.

Application filed June 3, 1882. (No model.)

*To all whom it may concern:*

Be it known that I, STEPHEN COLLINS, of Huntsville, county of Madison, and State of Alabama, have invented certain Improvements in Churns, of which the following is a specification.

My invention relates to an improvement in churns, which will be hereinafter fully described with reference to the accompanying drawings, in which—

Figure 1 represents a central sectional view, taken as indicated by the broken line 1 1 in Fig. 2, of a churn embracing my improvement in its construction; Fig. 2, a side elevation of the same, with the front portion of the containing box or shell A A' removed in order to display a different view of the agitating apparatus B; and Fig. 3, a detail view of part $c$ of a blade, C.

A indicates a box or containing-vessel for the milk to be churned, and consists of two parts—the lower one, A, upon the top of which the driving-shaft X has its bearings, and the upper part or top, A', which completes the inclosure of the operative parts. The driving-shaft X, which is provided with crank and handle H, by which it is operated, has its bearings for the crank end a little higher than the other end, so that the milk, while being churned, shall be induced to flow from the crank end of the shaft, as that end alone passes through the box to the outside, and thus no milk will escape, the two parts of the box being rendered liquid tight by a rabbet-joint, as shown. X' indicates another shaft having exactly the same form with shaft X, except that it has no bearings at all in the sides of the box A, and is so much shorter that its ends simply abut against the sides of the box, and each shaft is provided with a pair of parallel pulleys, B', the pulleys being provided with square openings in them to correspond with and fit over the square seats provided for them on the shafts, so that the pulleys cannot revolve upon them. All these disks are interchangeable, and each is provided with a groove on its periphery sufficiently deep for the endless cord $b$, and also with a series of cross-notches, $d$, of the form shown, for the reception of the edges of the paddles or blades C, so that when the blades are placed in position within them they will stand in planes that are radial to the shafts.

Each of the blades is composed of two parts, $c$ and $c'$, and are made fast together as one piece by the headed screw-bolts $c^2$ and their nuts. The especial object of having them in two parts is to fasten them securely against slipping upon the endless cords $b$, which object is effected by making the openings $c^3$ for the cords in the two parts of the blades so much smaller than the cords that the latter will be held immovably by the clamping action of the two parts and their screw-bolts. The cords $b$ are preferably made of wire, and are rendered non-corrosive by being galvanized, and I have devised a method of joining the two ends of the wire rope so as to make it endless, which consists in bending each end into the form of a hook, then hooking them together and providing a suitable chamber for them between the two parts $c$ and $c'$ for the two hooked ends, so that when the two parts of the blade are clamped together with sufficient force the hooks are prevented from giving way, and are concealed in the material of the blades, and so are removed from contact with the milk and butter, as shown in detail, Fig. 3. When the endless cords have been formed and the blades fastened upon them, as specified, the two shafts and their pulleys are placed within them and the shafts forced asunder sufficiently and held so between bars T, to afford the cords $b$ the required tension in the grooves in the pulleys B', and the whole is placed within the body of the box, the journal of the shaft X resting in its bearings, as shown. Then upon revolving the shaft X either way the endless cords and their blades will travel upon and over the pulleys B', and in doing so will thoroughly agitate the milk or cream from top to bottom of the box; but in order to hold this whole agitating apparatus B in its proper position in the containing-vessel, and to hold the two shafts at a proper distance asunder, I have devised the said two tension-bars T, provided at each end with suitable recesses for the ends of the shafts, to keep them from slipping out, and these bars hold the cords always as taut as required, and these bars are held to vertical movement only by two vertical slats or cleats, S, one on each side of bars T, and attached to the inside of the box A. The top A' being removed when the churning has been done, the whole apparatus may be raised and removed from the body A, the tension-bars removed, and the shafts and pulleys taken out of the cords, and the parts be scalded or otherwise cleaned.

Instead of the endless cord described, an endless band made of sheet metal may be used, and in that case the two ends of the strip of metal should be lapped and a rivet passed through the lap, and it be concealed and held fast in the joint between the two parts $c$ and $c'$ of the blade C; but the endless cord before described better meets my approbation.

By reference to the drawings it will be seen that the beaters C do the whole of their work below the driving-shaft, and the lower part of my box may be made of any depth required, and the number of beaters C increased accordingly, in order to increase the working capacity of my beating apparatus to any extent required.

What I claim as my invention, and desire to secure by Letters Patent, is—

1. The two tension-bars T, provided with their confining-cleats S, in combination with shafts X and X' and the beaters C, the whole adapted to hold the two shafts asunder and keep the cords $b$ always taut, substantially as described.

2. The frame consisting of the driving-shaft X, turning in bearings in part A of the containing-box, and the lower shaft, X', each shaft provided with a pair of grooved pulleys, B', and the endless cord $b$, and the two tension-bars T and their cleats S, adapted to hold the shafts asunder and the cords $b$ taut, the whole suspended upon shaft X, substantially as described.

3. The blades or beaters C, composed of the two parts $c$ and $c'$, each provided with corresponding semi-cylindrical recesses, so that when the two are in position together there will be cylindrical openings $c^3$ in the blades of less diameter than that of the endless cord $b$, upon which they are fastened by being clamped thereon by means of the headed screw-bolts $c^2$ and their nuts, substantially as described.

4. The endless cord $b$, made of a single piece of any suitable material, the two ends of which are fastened together by first being bent into hooks and then hooked together, and then placed between the parts $c$ and $c'$ of blade C, and clamped by force to prevent such parts from giving way, and to prevent their exposure to the contents of the containing-box, substantially as described.

STEPHEN COLLINS.

Witnesses:
   J. G. HURGAGH,
   FREDERICK C. GOODWIN.